H. WALDSCHMIDT.
DRAFT BAR ATTACHMENT FOR HARROWS.
APPLICATION FILED MAR. 15, 1910.
1,013,573.
Patented Jan. 2, 1912.
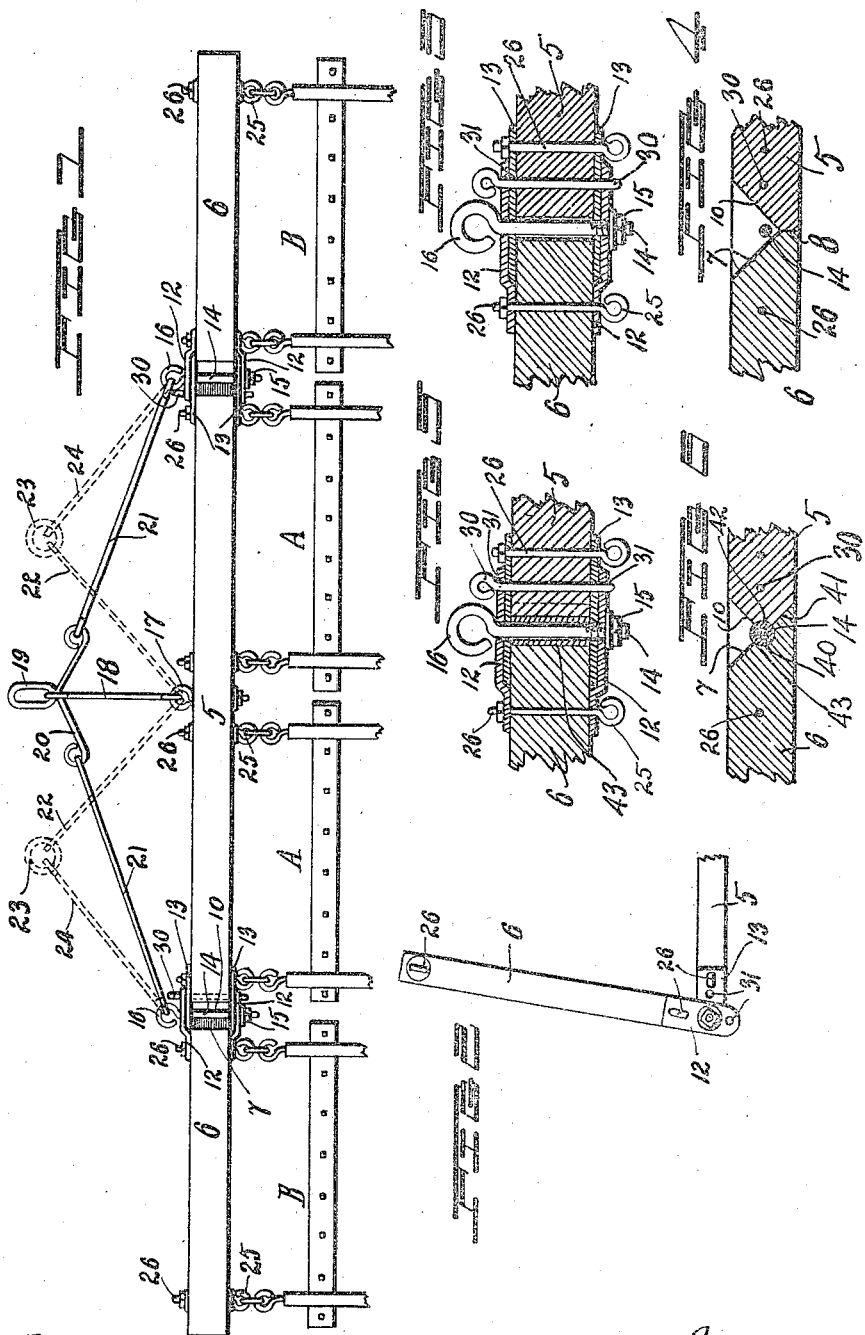
Witnesses
Robert Plows
[signature]
Inventor
Henry Waldschmidt
By [signature] Atty

UNITED STATES PATENT OFFICE.

HENRY WALDSCHMIDT, OF BENSON, ILLINOIS.

DRAFT-BAR ATTACHMENT FOR HARROWS.

1,013,573.   Specification of Letters Patent.   Patented Jan. 2, 1912.

Application filed March 15, 1910. Serial No. 549,553.

*To all whom it may concern:*

Be it known that I, HENRY WALDSCHMIDT, a citizen of the United States, residing at Benson, in the county of Woodford and State of Illinois, have invented certain new and useful Improvements in Draft-Bar Attachments for Harrows, of which the following is a specification.

This invention has reference to draft bar attachments for toothed harrows, and relates particularly to a new and improved sectional draft bar, the sections of which are hinged, and wherein the pintles forming the hinges serve as a means of connecting the draft devices for drawing the sections of harrows attached to said draft bar.

A further object of the invention is a draft bar constructed of folding sections, to each of which are attached harrow sections, whereby the harrow sections may be folded one upon the other to enable the same to be drawn through a gate, across bridges, or along narrow lanes or roads; and to connections for the draft devices with said draft bar coincident with the hinges thereof, so that the pull on said draft bar and for moving said harrow sections will be uniform, whether the sections are folded or not.

This invention has for a further object to provide a means for locking the draft bar sections in unfolded position so as to hold the same rigid, which means, if it is so desired, may be removed to allow the draft bar and harrow sections to conform to the unevenness of the ground.

In the drawings,—Figure 1 is a plan view of my improved draft bar, showing two different draft attachments, one in dotted lines, and portions of a plurality of harrow sections attached to said draft bar; Fig. 2 is a detail in elevation, showing how the end sections of the draft bar may be raised or folded; Fig. 3 is an enlarged sectional plan showing in detail the hinge construction; Fig. 4 is a cross section showing the hinge on a plane different from that shown in Fig. 3; Fig. 5 shows, in a view similar to Fig. 3, a modified form of hinge construction, and Fig. 6 is a cross section of the modification taken similarly to the section in Fig. 4.

Like characters of reference indicate corresponding parts throughout the figures.

In the drawings 5 and 6 denote sections of the draft bar. The inner or intermediate section is designated as 5 and the outside section as 6. The sections 6 are hinged to the section 5 in the following manner. The inner ends of the sections 6 are beveled on the upper side thereof as at 7, see Fig. 4, said bevel extending somewhat below the center of said bar 6. The outer or opposite ends of the section 5 are beveled as at 10, the bevel being in a direction opposite the bevel of the face 7 adjacent. In the normal or flat position of the draft bar sections 5 and 6, the portions of the ends below the bevels 7 and 10 coincide and abut as at 8, but when sections 6 or either of them are raised into a position such as shown in Fig. 2, the bevel face 7 of the section 6 is brought into engagement with the beveled end 10 of the section 5, which limits the movement of and forms a rest for the section 6.

To the inner ends of the sections 6 are attached hinge plates 12 which project beyond the ends of said sections; and to the opposite ends of the section 5 are attached hinge plates 13 which project beyond the ends of said section. The plates 12 and 13 of each of said sections are arranged to overlap and are provided with openings which coincide and through which are passed pintles 14 forming the hinge of the sections. One end of the pintles is provided with an eye 16 and to the other ends thereof are secured nuts 15 for retaining the pintles in working position. The pintles 14, together with a similar pintle or stem 17, secured to the section 5 intermediate its ends, serve as connecting means for the draft appliances for drawing the draft bar and harrow sections attached thereto.

The draft appliances preferably include the bar 18 connected to the stem 17 and which is also connected to the loop 19 of the bar 20 and to the opposite ends of the bar 20 are attached rods 21 which are attached to the eyes 16 of the pintles 14. The horses are attached to the loop 19 of bar 20. A modified connection would be to connect two rods 22 to the center stem 17, which would be connected to rings 23 to which would be attached rods 24, also connected to the pintles 14. To disconnect either of the sections 6, all that is required is to remove either of the pintles 14 and after detaching the section 6, replace said pintle. Said sections 6 of the draft bar are secured in a rigid position when attached by means of pins 30 said pins being passed through openings 31 in the extended end of plate 12, also passing through plates 13 and the bar 5. Said pins 30 may be of any desired construction and secured in position in any desired manner, but preferably so that they can be easily and quickly removed by hand.

The harrow sections which are designated as A, A and B, B are preferably attached to eyes or hooks 25 on the ends of threaded rods 26 secured to the sections 5 and 6 of the draft bar. Certain of such threaded rods, as shown, pass through and serve as a means of securing the hinge plates 12 and 13 to their respective draft bar sections.

In practice, modifications of the specific construction shown may be made, and any suitable materials and proportions may be used for the various parts without departing from the spirit of the invention, one of such modifications being shown in Figs. 5 and 6. The difference of construction here is simply that the bevel face 7 extends the entire thickness of the bar 6, having at approximately the center of said bevel the concave depression 40. Also the ends of the bars 5 adjacent the bar 6 has in addition to the bevel 10 the oppositely beveled portion 41, said portion 41 being adapted to abut with the lower portion of bevel 7. At the junction of the bevels 10 and 41 is the concave depression 42, said depression 42 together with depression 40 being adapted to contain a sleeve 43 which sleeve surrounds pintle 14 and lies between the two plates 13 of bar 5. As a further modification of this construction the hinge plates 12 and 13 may be interchanged, plates 13 being attached to bars 6 and plates 12 to bar 5. In this case the locking pins 30 would be inserted through the plates as before but through bars 6 instead of bar 5.

Having thus fully described my invention, what I claim and desire to secure by Letters Patent, of the United States, is:—

1. A draft-bar for a harrow, consisting of a plurality of hinged sections, the inner ends of certain of said sections being beveled on the upper side and extending to a point below the center of said sections, from which point the ends are squared, the matching ends of the other section being beveled and squared in a manner similar to the ends of the adjacent sections, the squared ends of the sections abutting when the sections are open or in a flat position, and the bevel ends of the sections abutting when said first mentioned sections are raised, a hinge connecting said sections, and a draft appliance also connected with said sections.

2. A draft-bar for harrows, consisting of a plurality of sections, hinge plates attached to the matching ends of each of said sections and arranged to overlap, spacing collars between said plates, a pintle for connecting said plates, said pintle carried through said collars, and a draft appliance connected with said pintles.

3. A draft-bar for a harrow, consisting of a plurality of hinged sections, the inner ends of the outside sections having portions beveled oppositely to each other, the opposite ends of the intermediate section being also beveled and adapted to engage with the bevel portions of the outside sections when raised to limit the movement of said outside sections, plates attached to both the outside and intermediate sections, spacing collars between said plates, a pintle passing through said plates and collars and forming a hinge connection between said plates, and a draft appliance connected with said pintles.

4. A draft-bar for a harrow, consisting of a plurality of hinged sections, the inner ends of certain of said sections being beveled on the upper side, said bevel portion extending to a point below the center of said sections, from which point the ends are squared, the matching ends of the other section being beveled and squared in a corresponding manner to the ends of the adjacent sections, the squared ends of the sections abutting when the sections are open or in a flat position, and the bevel ends of the sections abutting when the said first mentioned sections are raised, hinge plates connecting said sections, a pintle passing through said plates having an eye for the attachment of draft appliances, and a pin passing through said hinge plates and one of said sections for locking the sections in an open position.

5. A draft-bar for harrows, consisting of a plurality of sections, the ends of certain of said sections being beveled, the matching ends of the other section being beveled to correspond thereto, hinge plates attached to the ends of each of said sections and arranged to overlap and a pintle for connecting said plates.

6. A draft-bar for harrows, consisting of a plurality of sections, the ends of certain of said sections being beveled, the matching ends of the other section being beveled to correspond thereto, hinge plates attached to the ends of each of said sections and arranged to overlap, a pintle for connecting said plates having an eye for the attachment of draft appliances, and a pin passing through said hinge plates and said sections for locking the sections in position.

In testimony whereof I affix my signature, in presence of two witnesses.

HENRY WALDSCHMIDT.

Witnesses:
  CHAS. N. LA PORTE.
  ROBERT PLOWE.